(12) United States Patent
Grzywacz et al.

(10) Patent No.: US 9,992,730 B2
(45) Date of Patent: Jun. 5, 2018

(54) METHOD AND APPARATUS FOR DETERMINING WARNING ALERT LIST CONTENTS FOR ASSIGNMENT OF CELLS TO TRACKING AREA IDENTIFIERS

(71) Applicant: Provenance Asset Group LLC, Essex, CT (US)

(72) Inventors: Zdzislaw Grzywacz, Bydgoszcz (PL); Michael Dreiling, Bexley, OH (US); Gregory Smith, Powell, OH (US); Yigang Cai, Naperville, IL (US)

(73) Assignee: Provenance Asset Group LLC, Essex, CT (US)

( * ) Notice: Subject to any disclaimer, the term of this patent is extended or adjusted under 35 U.S.C. 154(b) by 225 days.

(21) Appl. No.: 14/588,352

(22) Filed: Dec. 31, 2014

(65) Prior Publication Data
US 2016/0191180 A1 Jun. 30, 2016

(51) Int. Cl.
| | | |
|---|---|---|
| *H04H 20/59* | (2008.01) |
| *H04H 20/72* | (2008.01) |
| *H04W 48/10* | (2009.01) |
| *H04W 4/22* | (2009.01) |
| *H04W 4/02* | (2018.01) |

(52) U.S. Cl.
CPC ............. *H04W 48/10* (2013.01); *H04W 4/22* (2013.01); *H04W 4/021* (2013.01)

(58) Field of Classification Search
CPC ....... H04H 20/59; H04H 20/72; H04W 48/10; H04W 4/22; H04W 76/007; H04W 28/0289; H04W 48/06; H04W 60/00; H04W 8/16; H04W 88/08; H04L 69/40
See application file for complete search history.

(56) References Cited

U.S. PATENT DOCUMENTS

2014/0323077 A1* 10/2014 Chandramouli ..... G08B 27/006
455/404.1

OTHER PUBLICATIONS

3GPP, 3GPP TS 23.041 V12.3.1 (Sep. 2013).*

* cited by examiner

*Primary Examiner* — James Yang
(74) *Attorney, Agent, or Firm* — Dinsmore & Shohl LLP

(57) ABSTRACT

A example method includes receiving, at a cell broadcast center (CBC) an alert request providing information for distribution to at least one user equipment, identifying a broadcast area based on the alert request, one or more cells within the broadcast area, determining a warning area list (WAL) for a message and transmitting the message with the WAL. The WAL may be a list of one or more Tracking Area Identity (TAIs) or a list of cell identifiers depending on various conditions.

3 Claims, 10 Drawing Sheets

100

METHOD AND APPARATUS FOR DETERMINING WARNING ALERT LIST CONTENTS FOR ASSIGNMENT OF CELLS TO TRACKING AREA IDENTIFIERS

BACKGROUND

This application relates generally to communication systems, and, more particularly, to alert messages, such as emergency alert messages, broadcast and provided to user equipment such as mobile devices.

Since the enactment of the Warning, Alert, and Response Network Act (WARN Act) in 2006 by the United States government, it has become important for mobile service providers, especially mobile carriers in the United States, to support emergency message broadcast/alert to mobile users. The WARN Act sought, in part, the establishment of a voluntary National Alert System to provide a public communications system capable of alerting the public to emergency situations on a national, regional, or local basis and set forth system functions and capabilities, including: (1) enabling appropriately credentialed government officials to alert the public to imminent threats that present a significant risk of injury or death; and (2) incorporating multiple communications technologies without interfering with existing alerts or communications systems employed by emergency response personnel. The WARN Act also directed the initiation of proceedings to: (1) allow licensees providing commercial mobile service to elect to transmit system alerts to mobile subscribers; and (2) require public broadcast television licensees to install necessary equipment to enable transmitters to receive and retransmit system alerts.

The WARN Act has led to the development of Wireless Emergency Alerts (WEA), formerly known as the Commercial Mobile Alert System (CMAS) and also known as Personal Localized Alerting Network (PLAN), which is an alerting network in the United States designed to disseminate emergency alerts to network user equipment such as mobile devices, cell phones, and pagers operating on variety of network technologies. Some European countries have also implemented similar requirements for mobile operators operating in their nations, resulting in the deployment of alerting systems equivalent to those deployed in the United States.

As emergency message broadcast/alert has matured as a service, the desire to utilize such service has also expanded to the delivery of commercial advertisement. Cell Broadcasting Center (CBC) network equipment, such as the Alcatel-Lucent Broadcasting Message Center (BMC), which fulfills emergency and alerting needs and desires (i.e., functionality) has been deployed in many markets and by many service providers (AT&T, VZ, Sprint, etc.).

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Current practice and standards (e.g., Cell Broadcast Service Protocol (CBSP), Service Area Broadcast Protocol (SABP) and the like) support the delivery of alert messages to user equipment. However, current practice and standards do not support the proper addressing the broadcast area when more than one Tracking Area Identity (TAI) is assigned to an eNodeB (eNB), i.e., where some of the cells of the eNB are assigned to one TAI while other of the cells of the eNB are assigned to other TAI. The ability to properly address a broadcast area is even more complex if the same TAI covers the cells from more than one eNB. For reference, attention is directed to FIG. 1, in particular cell C1-2, tracking area TAI1 and tracking area TAI2.

In particular, the following bulleted instances contribute to the difficulty of properly addressing a broadcast area:

In certain instances, an alert broadcast area covers (i.e., includes) the cells assigned to different TAIs, but these TAIs are only partially covered by (i.e., included in) the alert broadcast area. These instances are also analogous to the situation where one or more TAIs assigned to a given eNB are fully covered by an alert broadcast area while one or more other TAIs assigned to that eNB are only partially covered by the broadcast area.

In certain instances, the cells assigned to given eNB are assigned to TAI(s) which cover also the cells of other eNB(s).

To properly identify the alert broadcast area mentioned in the above bullets, both of the TAIs and cell IDs need to be provided in the Warning Area List (WAL) object of Write-Replace Warning Request (WRWR) message. However, standards related to emergency message broadcast/alert prohibit such messages. Therefore, to properly identify the broadcast area/s indentified as contributors to addressing difficulties in the above bulleted instances, change/s in the WRWR message structure and/or changes in Long Term Evolution network entities, (e.g., eNB, Mobility Management Element (MME) are required to permit the WRWR message to include TAIs and cell IDs. Either of such change/s requires approval by the applicable standards development organization responsible for the current standards. Any potential change/s in current standards is time consuming and costly to effect. Moreover, any such change/s effected typically result in future cascading complications to both service providers and Cell Broadcast Center (CBC) vendors.

Accordingly, embodiments according to the principles of the invention described herein properly address an alert broadcast area without requiring changes in the current standards or changes in LTE network entities other than CBCs. One embodiment provided herein is a CBC with a new broadcasting message service feature in which a specially grouped alert broadcast area (i.e., uniquely, either a grouped cell ID list or a grouped TAI list) is identified and included in Warning Area List element of Write-Replace Warning Request message sent by a CBC to MME.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
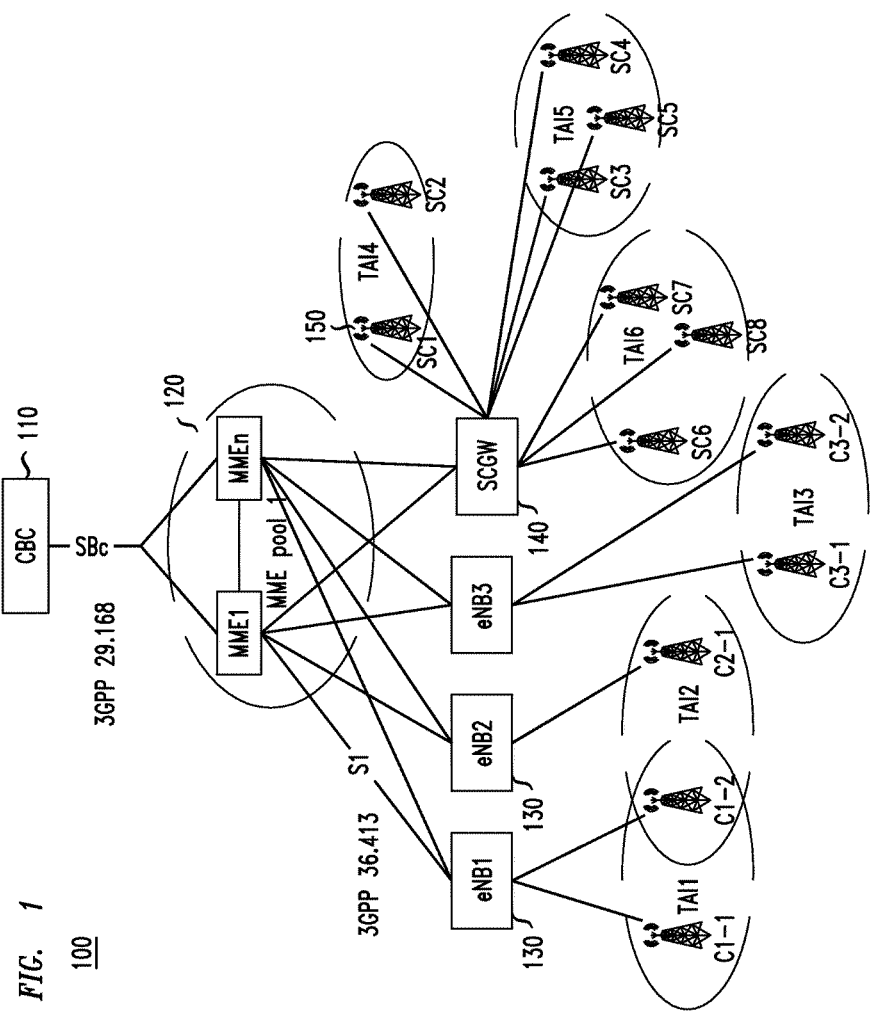
FIG. 1 conceptually illustrates one example embodiment of a wireless communication system according to the principles of the invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, provided are methodology and apparatuses for identifying a specially grouped broadcast area (i.e., uniquely, either a grouped cell ID list or a grouped TAI list) and generating a Warning Area List element of a Write-Replace Warning Request message that properly addresses the specially grouped broadcast area for transmission by a CBC to Mobility Management Element (MME). According to the provided embodiments, user equipment in a grouped broadcast area/s can be properly and efficiently addressed without changes to applicable standards and without over or under addressing user equipment in cell or tracking areas.

FIG. 1 conceptually illustrates one example embodiment of a wireless communication system according to the principles of the invention. The wireless communication system 100 includes Cell Broadcast Center (CBC) 110, Mobility Management Element (MME) pool 120, eNBs 130, Small Cell Gateway (SCGW) 140 and Small Cells (SC) 150.

Cell Broadcast Centers (CBC) 110 forward alerts messages for delivery to a User Equipment (UE) by a one or more of a plurality of technology networks. As illustrated in FIG. 1, CBC 120 communicates with a Long Term Evolution (LTE) network comprising MME pool 120, eNBs 130, and SCGW 140. CBC 110 communicates with LTE network 140 using one or more of 3GPP 29.168, 36.413, 36,331 and the like.

CBC 110 receives information associated with an alert message for distribution to one or more UEs (not shown) from a Cell Broadcast Entity (CBE) (not shown). An information provider uses a CBE to define and control the broadcast message/s. The CBE can be situated at the premises of the information provider and pass through an Alert Gateway (GW) (not shown) to reach CBC 110. In general, a GW is network node equipped for interfacing with another network that uses different communication protocols. Information associated with an alert message may be input to a CBE or computer or computer network (not shown) to which the alert gateway (not shown) interfaces.

The LTE network includes MME pool 120 (MME1 through MMEn shown). Responsibilities of the MME include idle mode User Equipment (UE) tracking and paging including retransmissions, involvement in bearer activation/deactivation process, and choosing a Serving Gateway (SGW) (not shown) for a UE at the initial attach and at time of intra-LTE handover. Individual MME of the MME pool 120 are interconnected with eNodeB 130 (eNB1, eNB2, eNB3 illustrated). MME may communicate with eNB via a S1 interface according to 3GPP TS 36.413.

eNB are able to communicate via antenna 135 with LTE capable UEs (not shown). Individual antenna of eNBs provide wireless service of a particular cell (i.e., area) (illustrated as an antenna). For example, in FIG. 1, eNB1 provides wireless service to cell C1-1 and cell C1-2; eNB2 provides wireless service to cell C2-1; and, eNB3 provides wireless service to cell C3-1 and cell C3-2. Cells are also associated with Tracking Areas Identifier (TAI) which indicates a geographical area and is defined by one or more cells. For example, in FIG. 1, cell C1-1 and cell C1-2 are associated with Tracking Area Identifier No. 1 (TAI1) (illustrated as a larger oval around C1-1 and C1-2); cell C1-2 and cell C2-1 are associated with TAI2; and, cell C3-1 and cell C3-2 are associated with TAI3. Each eNB 130 provides the hardware and functionality for communicating directly between UE and the 3GPP network.

SCGW 140 is a network node equipped for interfacing between the MME pool 120 and one or more SCs 150 (SC1-SC8 shown, though various other number of small cells may be deployed in other embodiments) using one of a variety of communication protocols. SCs provide wireless service to a geographic area identified by a cell identifier (e.g., SCS1, SC2, etc.) (illustrated as an antenna). Cell identifiers of SC cell likewise can be associated with a Tracking Area Identifier. For example, SC1 and SC2 are associated with TAI No. 4 (TAI4) (illustrated as a larger oval around SC1 and SC2); SC3, SC4, and SC5 are associated with TAI5; and SC6, SC7 and SC8 are associated with TAI6. Each SC 150 provides the hardware and functionality for communicating directly between UE (not shown) and the SCGW 140. UEs may implement transceivers that include transmitters for transmitting uplink signals toward and eNB and SC (via reverse link) and receivers for receiving downlink signals transmitted by the eNB and SC (via forward link). Communication over the air interface between a UE and the wireless network element takes places according to various agreed-upon standards and/or protocols. For example, UE may be a mobile handset, a cellular phone, a smart phone, a tablet computer, a laptop computer, or the like.

Other elements (not shown) of the wireless network 100 include elements of an LTE network are well know to those skilled in the art and thus not unnecessarily described here. Persons of ordinary skill in the art having benefit of the present disclosure should appreciate that the standards or protocols and network technologies are intended to be exemplary and other embodiments may use other standards or protocols and network technologies for supporting communication within the wireless communication system 100. For example, the wireless network may include elements of be a CDMA network, LTE network, Wideband-CDMA network, and Global System for Mobile Communications (GSM) network among other varied technology networks.

Figure 2:
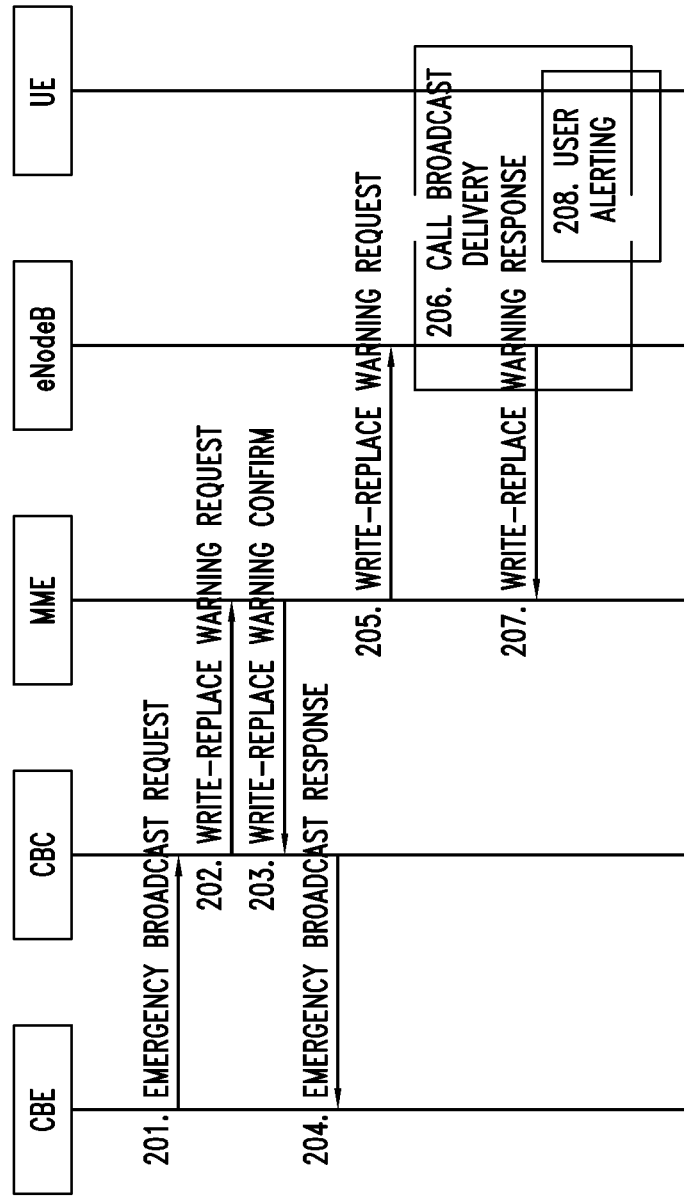
FIG. 2 is an illustration of the message flow according to an example embodiment.

FIG. 2 is an illustration of the alert broadcast message flow according to an example embodiment. In operation 201, CBE forwards an Emergency Broadcast Request message to CBC. The Emergency Broadcast Request message includes information that defines the broadcast message.

In operation 202, after processing the Emergency Broadcast Request message as described according to embodiments provided herein, the CBC forwards a Write-Replace Warning Request message to MME. The purpose of a Write-Replace Warning procedure is to start, overwrite the broadcasting of warning message, as defined in 3GPP TS 23.041.

In operation 203, MME returns a Write-Replace Warning Confirm message to CBC.

In operation 204, CBC returns an Emergency Broadcast response to CBE.

In operation 205, MME forwards a Write-Replace Warning Request to an eNB.

In operation 206, eNB broadcasts the alert message to UE according the Write-Replace Warning Request received from the MME.

In operation 207, eNB returns a Write-Replace Warning Response to MME.

In operation 208, the UE is alerted to the alert message.

Referring again to operation 202, the CBC uses logic that identifies a grouped broadcast area (i.e., uniquely, either a grouped cell ID list or a grouped TAI list) and generates a Warning Area List (WAL) element of a Write-Replace Warning Request (WRWR) message that properly addresses the grouped broadcast area for transmission by the CBC to one or more MME.

Per the standards 3GPP TS 23.041 and 3GPP TS 29.168, the WAL may contain choice of TAI(s), Emergency Area Identifiers (EAI(s)), or Cell(s), for a cell level distribution area, a tracking area identity (TAI) level distribution area and an emergency area (EA) level distribution area respectively. To address the alert when the alert broadcast area covers TAI/s and cells of the same eNB and/or the cells of the alert are associated with a TAI which is associated also with other eNB(s), changes in the standards are seemingly not avoidable.

Embodiments provided herein use a unique method to properly handle such alert requests for various scenarios and broadcast areas with no any changes needed in the standards and in LTE network entities (MME, eNB). In general, one or more embodiments logically group the elements (cells and TAIs) and place them in WAL (either identifying cells or TAIs, but not both) depending on their assignments to eNBs. In other words, if TAIs fully cover the broadcast area associated with particular eNB, then the WAL contains the TAIs in WRWR message sent to such eNB. If there is even one cell assigned to any TAI associated with given eNB which is outside the broadcast area, then the WAL contains the cells only (even the other TAIs associated with such eNB are fully covered by the broadcast area) in WRWR message sent to such eNB. With this new CBC logic, some of eNBs receive a cells list only in WAL while other eNBs receive a TAIs list only in the WAL. The same serial number for the alert is used for the alert messages sent to these eNBs. The new CBC logic is designed to allow a WRWR message with cells identified in the WAL to be sent to a different set of eNBs which are other than those eNBs which receive WRWR messages containing the TAIs in WAL for distribution of a particular alert broadcast message. When there is a special need, the new CBC logic will send multiple WRWR messages, and each WRWR message shall contain either a cell list or a TAI list (but not both) to cover cells in multiple eNBs with different TAI assignments. As a result of this new logic, the same alert (with the same serial number) is not sent to the same eNB twice and thus an alert duplication event will not occur. The described methodology presents a never-seen-before CBC logic in which grouped cell lists or TAI list in WAL so that to overcome the difficult problem of the broadcast area when more than one TAI is assigned to eNB.

Besides the features already mentioned in the above, a method according to the principles of the invention may also be utilized to:

1) send alert message(s) to an LTE network that includes eNBs having the cells assigned to different TAIs; some of the cells may share a TAI with cells assigned to other eNB(s).

2) perform alert area mapping on to WAL contents with either a cell list or a TAI list but not both result in the entire broadcast area being properly identified in WRWR.

In order to best fit existing emergency alerting practice and standards without impacting network architecture and network element design (e.g., MME, eNB and UE design), the provided methodology considered following requirements/conditions:

1) there are no opaque extension attributes that the CBC can use to pass additional data to LTE entities (e.g., MME, eNB, LTE phones).

2) the methodology must be interoperable with current standards such that it does not cannot break existing phones and does not break eNB duplicate message detection.

FIGS. 3-8 are conceptual illustrations that demonstrates addressing of an alert broadcast area according to the principles of the invention. Various scenarios are described with respect to FIGS. 3-8. The following use cases reflect the logic implemented by embodiments according to the principles of the invention to identify a broadcast area.

Conceptual illustrations FIGS. 3-6 show two eNBs, namely eNB1 and eNB2. eNB1 includes cells C1, C2, C3, C4, C5 and C6. eNB2 includes cells C7, C8, C9, C10, C11, and C12. Five tracking areas (TAI-1, TAI-2, TAI-3, TAI-4, and TAI5) are illustrated. TAI-1 includes cells C5, C6, C7 and C8 and thus spans portions of eNB1 and eNB2. TAI-2 includes cells C3 and C4 and is entirely within eNB1. TAI-3 includes cells C1 and C2 and is entirely within eNB1. TAI-4 includes cells C9, C10 and C11 and is entirely within eNB2. TAI-5 includes cells C12 and is entirely within eNB2. A CBC may also be referred to as a BMC in the Figures.

Figure 3:
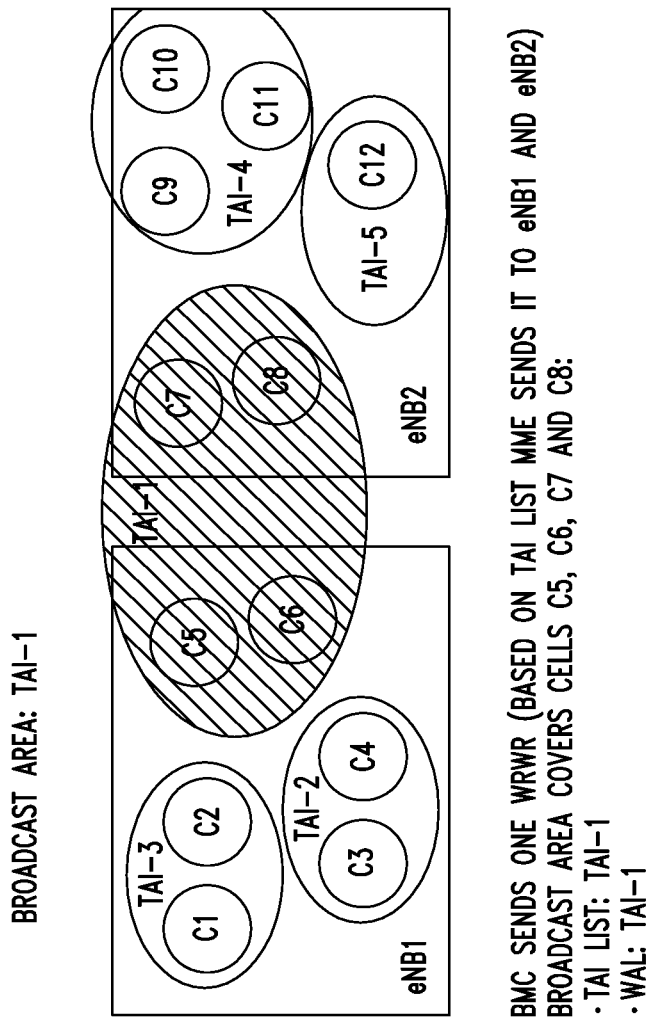
FIG. 3 is a conceptual illustration that demonstrates addressing of an alert broadcast area according to the principles of the invention.

FIG. 3 is a conceptual illustration that demonstrates addressing of an alert broadcast area according to the principles of the invention. In the use case of FIG. 3, all cells in the broadcast area belong to the same TAI. The entire TAI is covered by a broadcast area. The CBC will first receive an alert request and processes it. During the processing, the CBC identifies the broadcast area. In this example, the CBC determines that the broadcast area includes cells C5, C6, C7 and C8. The CB C then determines that the cells identified within broadcast area belong to the same TAI (in this example, TAI-1) and that all cells in this TAI (in this example, TAI-1) are located within the broadcast area. Based on this determination, the CBC determines that it should send an all cells broadcast to a list of TAIs and the CBC determines that the WAL shall contain only the list of TAIs. Accordingly, the CBC sends a WRWR message with the WAL populated with only a TAI list of the TAIs identified (in this example, TAI-1). Also, note that one or more eNBs may be messaged (in this example, eNB1 and eNB2 are messaged as TAI-1 implicates eNB1 and eNB2). Thus, the CBC sends a WRWR message with the WAL populated with only a TAI list of the TAIs identified (in this example, TAI-1) to implicated eNBs (in this example, eNB1 and eNB2). In one embodiment, whenever the CBC determines that it should send an all-cells broadcast (other than nationwide) to a list of TAIs, then the WAL shall contain only the list of TAIs.

Figure 4:
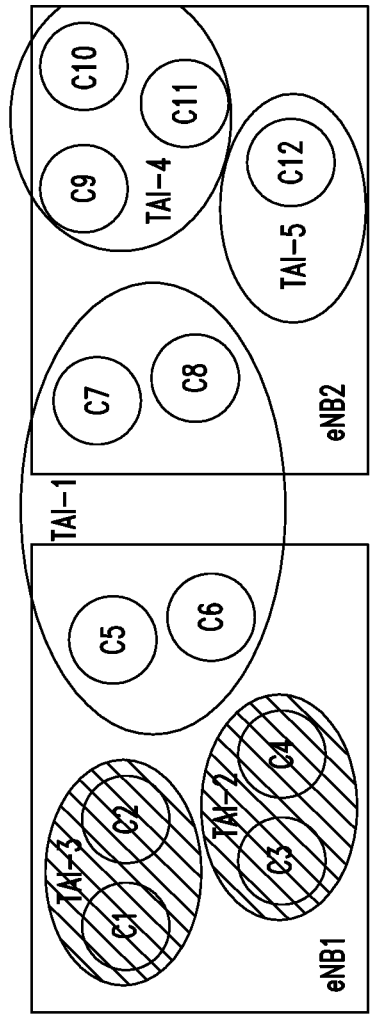
FIG. 4 is a conceptual illustration that demonstrates addressing of an alert broadcast area according to the principles of the invention.

FIG. 4 is a conceptual illustration that demonstrates addressing of an alert broadcast area according to the principles of the invention. In the use case of FIG. 4, the cells in the broadcast area belong to different TAIs in an MME Pool. Entire TAIs are in the broadcast area. This use case also presumes that the LTE network is enabled, that EAIs are not provisioned, that there is no mapping of geocodes onto EAIs provisioned; and all TAIs are covered by a single MME pool.

With reference to FIG. 4, the CBC will first receive an alert request and process it. During the processing, CBC identifies the broadcast area. In this example, the CBC determines that the broadcast area includes cells C1, C2, C3 and C4. The CBC then determines that the cells identified within broadcast area belong to a plurality of TAIs (in this example, TAI-1 and TAI-2) and that all cells in these TAIs (here, TAI-1 and TAI-2) are located within the broadcast area. Based on this determination, the CBC determines that it should send an all cells broadcast to a list of TAIs and the CBC determines that the WAL shall contain only the list of TAIs. Accordingly, the CBC sends a WRWR message with the WAL populated with only a TAI list of the TAIs identified (in this example, TAI-1 and TAI-2). Also note that one or more eNBs may messaged (in this example however, only eNB1 is messaged as TAI-2 and TAI-3 implicates only eNB1). Thus, the CBC sends a WRWR message with the WAL populated with only a TAI list of the TAIs identified (in this example, TAI-1) to implicated eNBs (in this example, eNB1). In one embodiment, whenever the CBC determines that it should send an all-cells broadcast (other than nationwide) to a list of TAIs, then the WAL shall contain only the list of TAIs.

Figure 5:
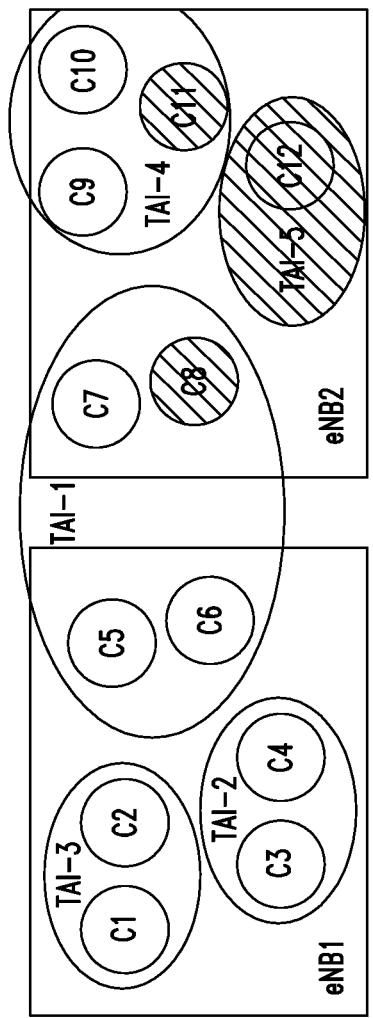
FIG. 5 is a conceptual illustration that demonstrates addressing of an alert broadcast area according to the principles of the invention.

FIG. 5 is a conceptual illustration that demonstrates addressing of an alert broadcast area according to the principles of the invention. In the use case of FIG. 5, the cells in the broadcast area cover different TAIs assigned to a single eNB in an MME Pool. Some TAIs are fully covered by the broadcast area, and some TAIs are partially covered by the broadcast area. This use case also presumes that the LTE network is enabled, that EAIs are not provisioned, that there is no mapping of geocodes onto EAIs provisioned; and all TAIs are covered by a single MME pool.

With reference to FIG. 5, the CBC will first receive an alert request and process it. During the processing, CBC identifies the broadcast area. In this example, the CBC determines that the broadcast area includes cells C8, C11, and C12. The CBC then determines that some TAIs are entirely within broadcast area (i.e., all cells assigned to these TAIs are located within broadcast area) (in this example, TAI-5 defined by C12) while some TAIs are partially covered (i.e., not all of the cells belonging to these TAIs are located within broadcast area) (in this example, for TAI-1, C8 is in the broadcast area while C5, C6 and C7 are not in the broadcast area; similarly, for TAI-4, C11 is in the broadcast area while C9 and C10 are not in the broadcast area). Based on this determination, the CBC determines that it should send an all cells broadcast to a list of TAIs and the CBC determines that the WAL shall contain only a list of cells. Accordingly, the CBC sends a WRWR message with the WAL populated with only a cells list of the cells identified (in this example, C8, C11 and C12) to implicated eNBs (in this example, eNB1 and eNB2 which are implicated by TAI-1, TAI-4 and TAI-5). Note that eNBs that are messaged may drop the message because they do not have cell referred to in the WAL (in this example, eNB1 drops the message because it has no cell that is referred to in the WAL).

Figure 6:
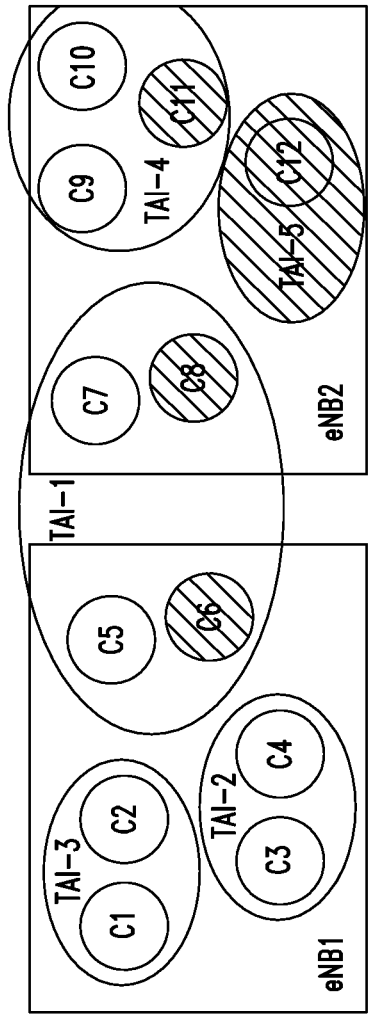
FIG. 6 is a conceptual illustration that demonstrates addressing of an alert broadcast area according to the principles of the invention.

FIG. 6 is a conceptual illustration that demonstrates addressing of an alert broadcast area according to the principles of the invention. In the use case of FIG. 6, the cells in the broadcast area cover different TAIs assigned to different eNBs in an MME Pool. Some TAIs are fully covered by the broadcast area, and some TAIs are partially covered by the broadcast area. This use case also presumes that the LTE network is enabled, that EAIs are not provisioned, that there is no mapping of geocodes onto EAIs provisioned; and all TAIs are covered by a single MME pool.

With reference to FIG. 6, the CBC will first receive an alert request and process it. During the processing, CBC identifies the broadcast area. In this example, the CBC determines that the broadcast area includes cells C6, C8, C11, and C12. The CBC then determines that some TAIs are entirely within broadcast area (i.e., all cells assigned to these TAIs are located within broadcast area) (in this example, TAI-5 defined by C12) while some TAIs are partially covered (i.e., not all of the cells belonging to these TAIs are located within broadcast area) (in this example, for TAI-1, C6 and C8 are in the broadcast area while C5 and C7 are not in the broadcast area; similarly, for TAI-4, C11 is in the broadcast area while C9 and C10 are not in the broadcast area). Based on this determination, the CBC determines that it should send an all cells broadcast to a list of TAIs and the CBC determines that the WAL shall contain only a list of cells. Accordingly, the CBC sends a WRWR message with the WAL populated with only a cells list of the cells identified (in this example, C6, C8, C11 and C12) to implicated eNBs (in this example, eNB1 and eNB2 which are implicated by TAI-1, TAI-4 and TAI-5). Also note that one or more eNBs may be implicated (in this example, eNbB1 and eNB2 are implicated by the TAI list). Note that eNBs that are messaged may drop the message because they do not have cell referred to in the WAL (in this example, both eNB1 and eNB2 utilize the message because they have a cell that is referred to in the WAL). In another embodiment, a WRWR message may be directed to each respective affected eNB, with corresponding WRWR messages having a WAL populated with only a cells list of the cells identified and controlled by the respective affected eNB.

Figure 7:
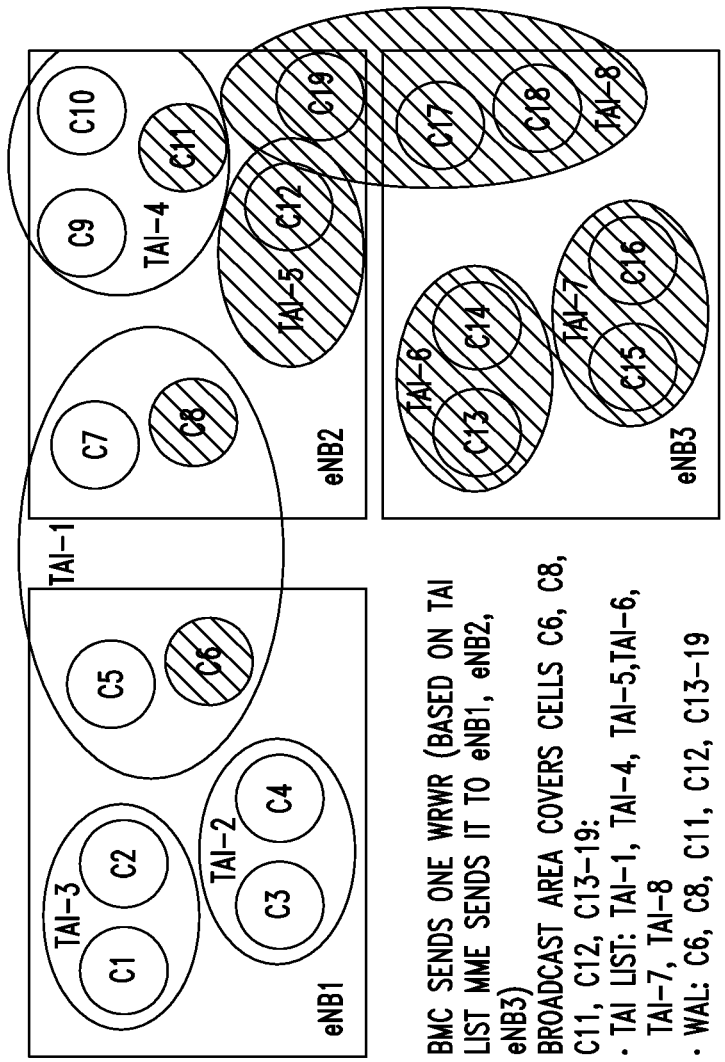
FIG. 7 is a conceptual illustration that demonstrates addressing of an alert broadcast area according to the principles of the invention.

Conceptual illustration FIG. 7 shows three eNBs, namely eNB1, eNB2 and eNB3. eNB1 includes cells C1, C2, C3, C4, C5 and C6. eNB2 includes cells C7, C8, C9, C10, C11, C12, and C19. eNB3 includes cells C13, C14, C15, C16, C17, and C18. Eight tracking areas (TAI-1, TAI-2, TAI-3, TAI-4, TAI-5, TAI-6, TAI-7, and TAI8) are illustrated. TAI-1 includes cells C5, C6, C7 and C8 and thus spans portions of eNB1 and eNB2. TAI-2 includes cells C3 and C4 and is entirely within eNB1. TAI-3 includes cells C1 and C2 and is entirely within eNB1. TAI-4 includes cells C9, C10 and C11 and is entirely within eNB2. TAI-5 includes cells C12 and is entirely within eNB1. TAI-6 includes cells C13 and C14 and is entirely within eNB3. TAI-6 includes cells C15 and C16 and is entirely within eNB2. TAI-8 includes cells C17, C18, and C19 and thus spans portions of eNB2 and eNB3.

FIG. 7 is a conceptual illustration that demonstrates addressing of an alert broadcast area according to the principles of the invention. In the use case of FIG. 7, the cells in the broadcast area cover different TAIs assigned to different eNBs in an MME Pool. Some TAIs are fully covered by the broadcast area, and some TAIs are partially covered by the broadcast area. This use case also presumes that the LTE network is enabled, that EAIs are not provisioned, that there is no mapping of geocodes onto EAIs provisioned; and all TAIs are covered by a single MME pool.

With reference to FIG. 7, the CBC will first receive an alert request and process it. During the processing, CBC identifies the broadcast area. In this example, the CBC determines that the broadcast area includes cells C6, C8, C11, C12, and C13-C19. The CBC then determines that some TAIs are entirely within broadcast area (i.e., all cells assigned to these TAIs are located within broadcast area) (in this example, TAI-5 defined by C12; TAI-6 defined by C13 and C14; TAI-7 defined by C15 and C16; TAI-8 defined by C17, C18 and C19) while some TAIs are partially covered (i.e., not all of the cells belonging to these TAIs are located within broadcast area) (in this example, for TAI-1, C6 and C8 are in the broadcast area while C5 and C7 are not in the broadcast area; similarly, for TAI-4, C11 is in the broadcast area while C9 and C10 are not in the broadcast area). Based on this determination, the CBC determines that it should send an all cells broadcast to a list of TAIs and the CBC determines that the WAL shall contain only a list of cells. Accordingly, the CBC sends a WRWR message with the WAL populated with only a cells list of the cells identified (in this example, C6, C8, C11, C12, and C13-C19) to implicated eNBs (in this example, eNB1, eNB2, and eNB3 which are implicated by TAI-1, TAI-4, TAI-5, TAI-6, TAI-7 and TAI-8). Also note that one or more eNBs may be messaged (in this example, eNbB1, eNB2 and eNB3 are implicated by the TAI list). In one embodiment, a WRWR message may be directed to each respective affected eNB, with corresponding WRWR messages having a WAL populated with only a cells list of the cells identified and controlled by the respective affected eNB.

Figure 8:
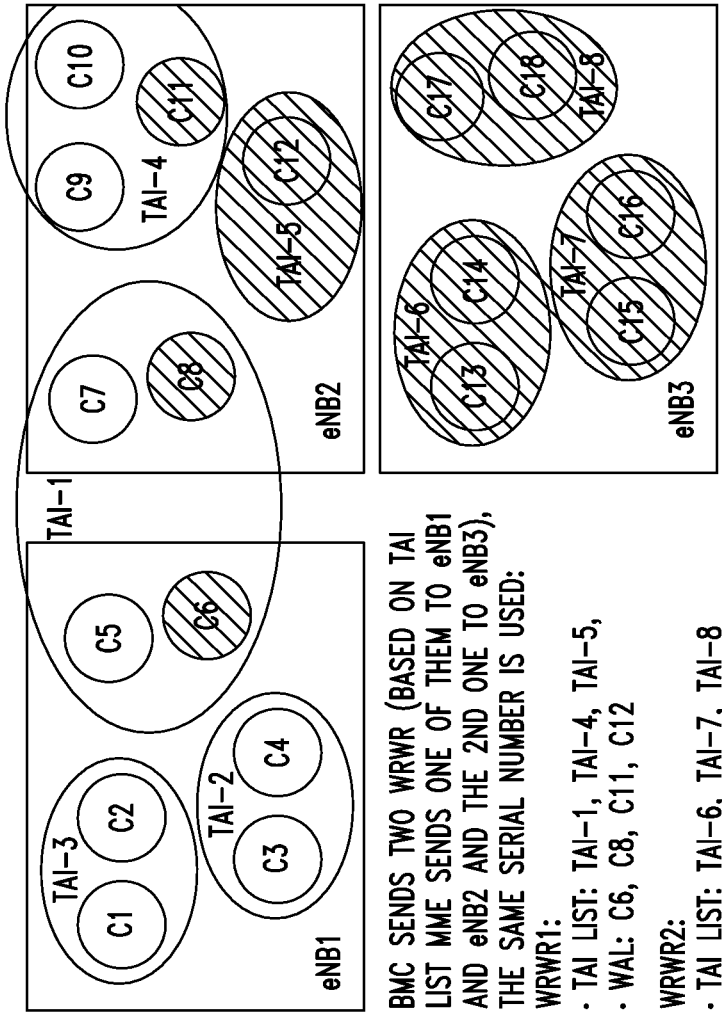
FIG. 8 is a conceptual illustration that demonstrates addressing of an alert broadcast area according to the principles of the invention.

FIG. 8 is a conceptual illustration that demonstrates addressing of an alert broadcast area according to the principles of the invention. Conceptual illustration FIG. 8 shows three eNBs, namely eNB1, eNB2 and eNB3. eNB1 includes cells C1, C2, C3, C4, C5 and C6. eNB2 includes cells C7, C8, C9, C10, C11, and C12. eNB3 includes cells C13, C14, C15, C16, C17, and C18. Eight tracking areas (TAI-1, TAI-2, TAI-3, TAI-4, TAI-5, TAI-6, TAI-7, and TAI8) are illustrated. TAI-1 includes cells C5, C6, C7 and C8 and thus spans portions of eNB1 and eNB2. TAI-2 includes cells C3 and C4 and is entirely within eNB1. TAI-3 includes cells C1 and C2 and is entirely within eNB1. TAI-4 includes cells C9, C10 and C11 and is entirely within eNB2. TAI-5 includes cells C12 and is entirely within eNB1. TAI-6 includes cells C13 and C14 and is entirely within eNB3. TAI-6 includes cells C15 and C16 and is entirely within eNB2. TAI-8 includes cells C17 and C18 and is entirely within eNB2.

In the use case of FIG. 8, the cells in the broadcast area cover different TAIs assigned to different eNBs in an MME Pool. Some TAIs are fully covered by the broadcast area, and some TAIs are partially covered by the broadcast area. This use case also presumes that the LTE network is enabled, that EAIs are not provisioned, that there is no mapping of geocodes onto EAIs provisioned; and all TAIs are covered by a single MME pool.

With reference to FIG. 8, the CBC will first receive an alert request and process it. During the processing, CBC identifies the broadcast area. In this example, the CBC determines that the broadcast area includes cells C6, C8, and C11-C18. The CBC then determines that the identified cells of the broadcast area belong to a few TAIs. The CBC determines that some TAIs are entirely within broadcast area (i.e., all cells assigned to these TAIs are located within broadcast area) (in this example, TAI-5 defined by C12; TAI-6 defined by C13 and C14; TAI-7 defined by C15 and C16; TAI-8 defined by C17 and C18) while some TAIs are partially covered (i.e., not all of the cells belonging to these TAIs are located within broadcast area) (in this example, for TAI-1, C6 and C8 are in the broadcast area while C5 and C7 are not in the broadcast area; similarly, for TAI-4, C11 is in the broadcast area while C9 and C10 are not in the broadcast area).

The CBC may also determine that some of the eNBs do not share the TAI assigned to them with other eNBs (i.e., all TAIs assigned to a given eNB do not have cells that are associated with any other eNBs) (in this example, eNB3). In these instances, for these eNBs, the CBC will also determine on an eNB-by-eNB basis whether the cells identified within the broadcast area belong to the same one or more TAI (in this example, eNB3 has TAI-6 with C13 and C14; TAI-7 with C15 and C16; TAI-8 with C17 and C18) and that all cells in these one or more TAI are located within the broadcast area (in this example, all cells of TAI-6, TAI-7 and TAI-8 are in the broadcast area). eNBs that meet these conditions (in this example, eNB2) can be sent a WRWR message with a WAL containing only the list of TAIs. eNB that do not have cells identified within the broadcast area that belong to the same one or more TAI that do not have all cells in these one or more TAI in the broadcast area are determined to require a WRWR message with a WAL containing only the list of cells (in this example eNb2 has TAI-5 with all cells C12 in the broadcast area; but TAI-4 with C-11 in the broadcast area and with C9 and C10 not in the broadcast area (a so called "partial TAI") and TAI-1 with which shares an assigned TAI with another eNB).

Based on these determinations, the CBC determines whether it should send two WRWR messages. The two messages utilize the same serial number so that this broadcast may be uniquely identified. A first WRWR message refers to the cells in WAL (i.e., cell list only) while the second WRWR message refers to TAIs (i.e., TAI list only). The first WRWR message refers in TAI List to TAIs which share the cells among different eNBs while the second WRWR message refers in TAI List to TAIs which don't share the cells among eNBs. Accordingly, the CBC may send a WRWR message with the WAL populated with only a cells list of the cells identified (in this example, WRWR1 is sent with a WAL list identifying C6, C8, C11, and C12) and the CBC may send a WRWR message with the WAL populated a list of the TAI identified (in this example, WRWR1 is sent with a WAL list identifying TAI-6, TAI-7 and TAI-8). Messaging proceeds as previously described to eNBs implicated the TAI list (in this example, eNB1, eNB2, and eNB3 which are implicated by TAI-1, TAI-4, TAI-5, TAI-6, TAI-7 and TAI-8).

Figure 9:
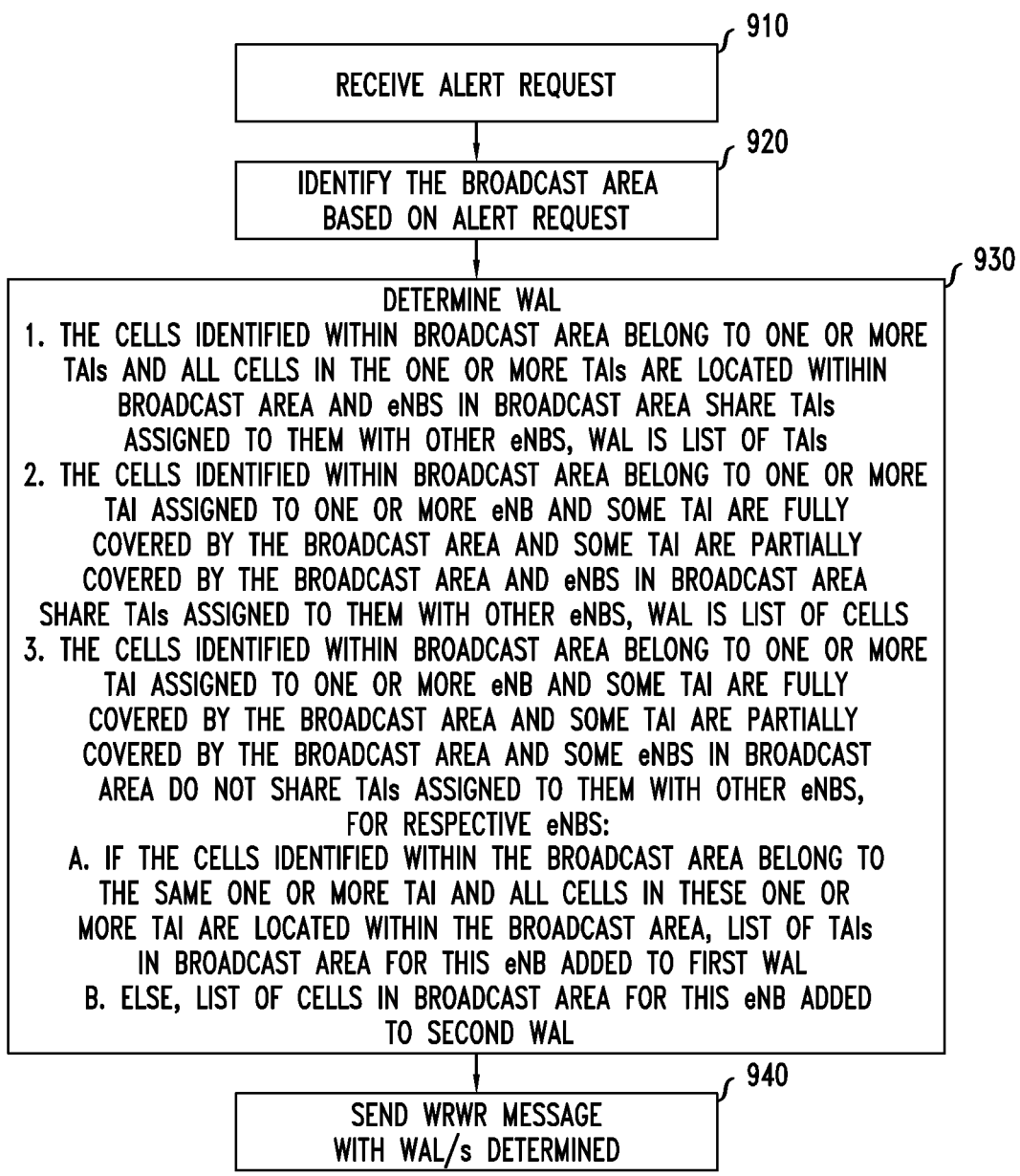
FIG. 9 is an example flowchart of a high level description of the steps of an example method according to the principles of the invention.

FIG. 9 is an example flowchart of a high level description of the steps of an example method according to the principles of the invention.

In operation 910, a CBC receives alert request providing information for distribution to at least one user equipment. The information for distribution may relate to an emergency notification, a network test, or a commercial advertisement.

In operation 920, the CBC identifies the broadcast area based on alert request.

In operation 930, the CBC Determine one or more WAL for a WRWR message. In particular, the CBC identifies that WAL according to the following:

1. When the cells identified within the broadcast area belong to one or more TAIs AND all cells in the one or more TAIs are located within the broadcast area AND eNBs in broadcast area share TAIs assigned to them with other eNBs, the WAL is list of TAIs.

2. When the cells identified within the broadcast area belong to one or more TAI assigned to one or more eNB AND some TAI are fully covered by the broadcast area and some TAI are partially covered by the broadcast area AND eNBs in broadcast area do not share TAIs assigned to them with other eNBs, the WAL is list of cells.

3. When the cells identified within the broadcast area belong to one or more TAI assigned to one or more eNB AND some TAI are fully covered by the broadcast area and some TAI are partially covered by the broadcast area AND some eNBs in broadcast area do not share TAIs assigned to them with other eNBs, for respective eNBs:
a. If the cells identified within the broadcast area belong to the same one or more TAI and all cells in these one or more TAI are located within the broadcast area, the list of TAIs in broadcast area for this eNB added to a first WAL.
b. Else, the list of cells in broadcast area for this eNB added to second WAL In operation 940, the CBC send a WRWR message with the single WAL determined or send two WRWR messages, a first WRWR with first WAL determined and a second WRWR with the second WAL determined. If only the first or second WAL has content, only that WAL is sent (i.e. transmitted).

Benefits of the provided embodiments include one or more of the following:

proper and efficient addressing of an alert message number;

existing emergency alerting network standards, architecture, and protocols are not altered; and handset designs and performances are not impacted.

Figure 10:
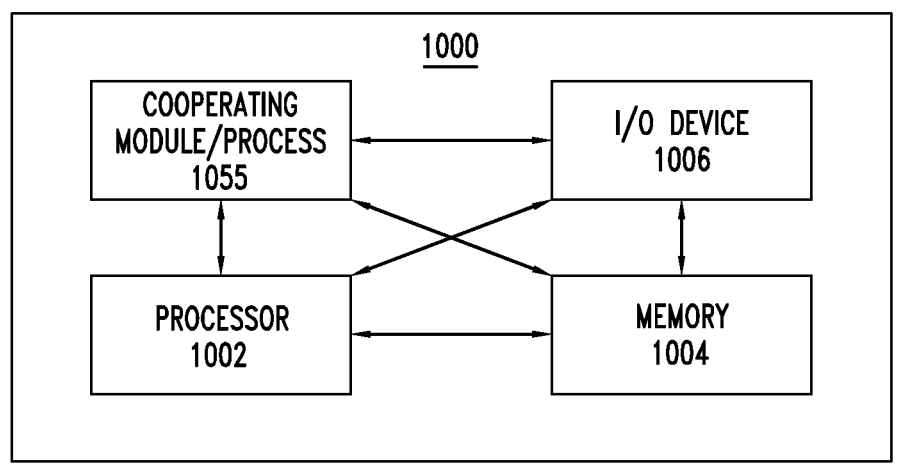
FIG. 10 depicts a high-level block diagram of a computer suitable for use in performing functions described herein.

FIG. 10 depicts a high-level block diagram of a computer suitable for use in performing functions described herein. The computer 1000 includes a processor 1002 (e.g., a central processing unit (CPU) or other suitable processor(s)) and a memory 1004 (e.g., random access memory (RAM), read only memory (ROM), and the like).

The computer 1000 also may include a cooperating module/process 1005. The cooperating process 1005 can be loaded into memory 1004 and executed by the processor 1002 to implement functions as discussed herein and, thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1000 depicted in FIG. 10 provides a general architecture and functionality suitable for implementing functional elements described herein or portions of functional elements described herein. For example, the computer 1000 provides a general architecture and functionality suitable for implementing one or more of Cell Broadcast Entity (CBE), Cell Broadcast Centers (CBC), Broadcasting Message Center (BMC), one or more elements of CDMA network, one or more elements LTE network, User Equipment (UE), or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of storage medium or implemented over some type of transmission medium. The storage medium, such as a non-transitory storage medium, may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A method comprising:
receiving, at a cell broadcast center (CBC) an alert request providing information for distribution to at least one user equipment;
identifying, at the CBC, a broadcast area based on the alert request, one or more cells within the broadcast area;
determining, at the CBC, a warning area list (WAL) for a message, wherein
the WAL in first form is a list of one or more Tracking Area Identity (TAIs) associated with at least the one or more cells when the one or more cells within the broadcast area belong to the one or more TAIs, all cells associated with the one or more TAIs are located within the broadcast area, and eNBs within the broadcast area share TAIs assigned to them with other eNBs,
the WAL in second form is list of the one or more cells within the broadcast area when the one or more cells identified within the broadcast area belong to one or more TAI assigned to one or more eNB, some TAI are fully covered by the broadcast area and some TAI are partially covered by the broadcast area, and the eNBs within the broadcast area do not share TAIs assigned to them with the other eNBs, and
when the one or more cells identified within the broadcast area belong to one or more TAI assigned to one or more eNB, some TAI are fully covered by the broadcast area, and some TAI are partially covered by the broadcast area, and a plurality of the eNBs in broadcast area do not share TAIs assigned to them with the other eNBs, for respective eNBs:
a first list of TAIs in broadcast area for a respective eNB is added to a first WAL when all cells within the first list of TAIs are identified as being within the broadcast area, and a second list of cells for a respective eNB is added to a second WAL when all cells within the second list of TAIs are not identified as being within the broadcast area; and
transmitting, at the CBC, the message with the WAL, the first WAL or the second WAL.

2. The method of claim 1 wherein the information for distribution relates to an emergency notification, a network test, or a commercial advertisement.

3. The method of claim 1 wherein the message is a Write-Replace Warning Request (WRWR) message.

* * * * *